Nov. 10, 1953
L. V. WELLS
NEGATIVE FEEDBACK FREQUENCY RESPONSE COMPENSATION AMPLIFIER SYSTEM
2,658,958
Filed July 16, 1949
2 Sheets-Sheet 1
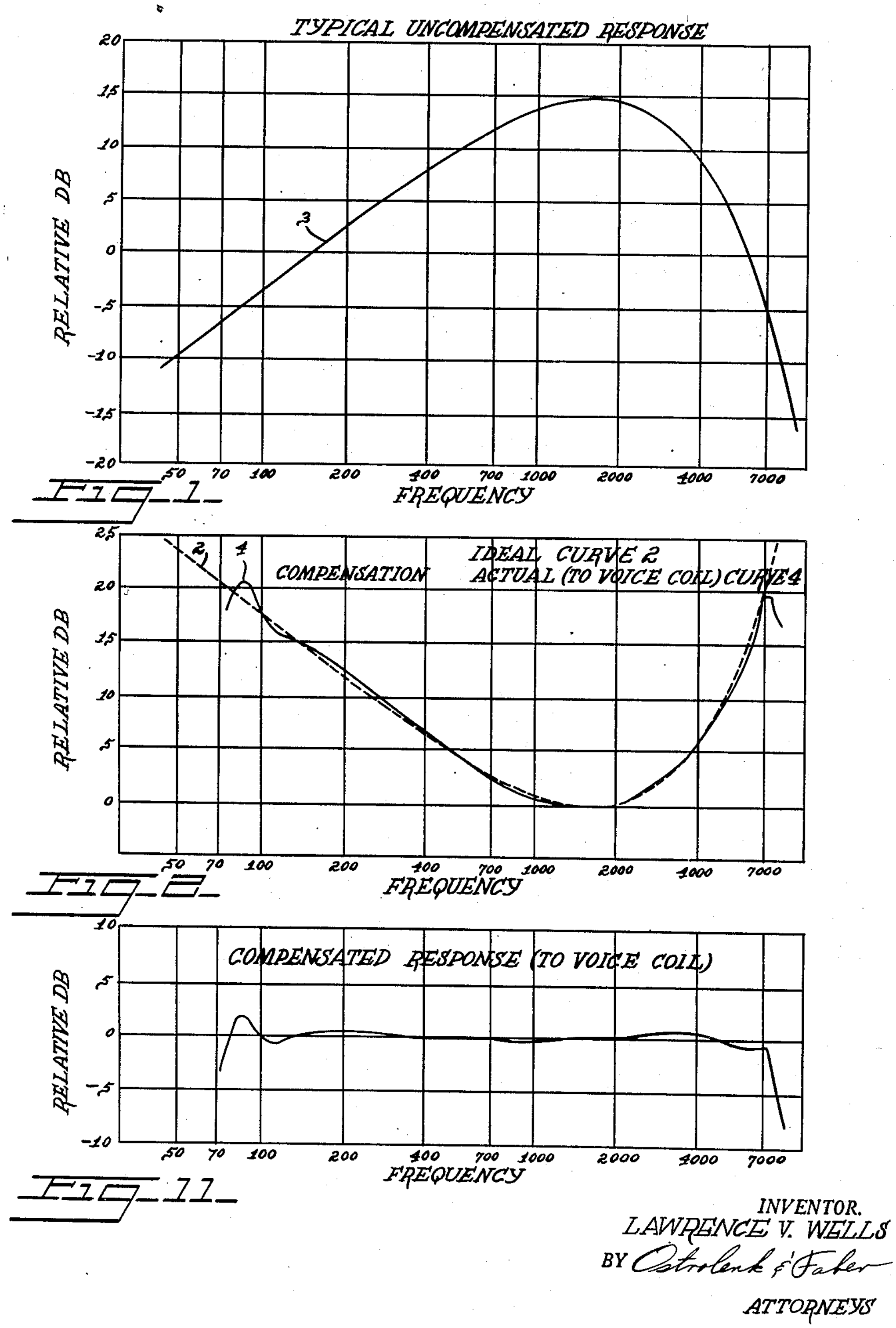
FIG. 1 FIG. 2 FIG. II
INVENTOR.
LAWRENCE V. WELLS
BY Ostrolenk & Faber
ATTORNEYS Nov. 10, 1953

L. V. WELLS

NEGATIVE FEEDBACK FREQUENCY RESPONSE COMPENSATION AMPLIFIER SYSTEM 2,658,958

Filed July 16, 1949

2 Sheets-Sheet 2

INVENTOR.
LAWRENCE V. WELLS
BY Ostrolenk & Faber
ATTORNEYS

Patented Nov. 10, 1953

2,658,958

UNITED STATES PATENT OFFICE 2,658,958

NEGATIVE FEEDBACK FREQUENCY RESPONSE COMPENSATION AMPLIFIER SYSTEM

Lawrence V. Wells, Charlotte, Mich., assignor to Wilcox-Gay Corporation, Charlotte, Mich., a corporation of Michigan Application July 16, 1949, Serial No. 105,221

3 Claims. (Cl. 179—171)

This invention relates to compensation of the frequency response of amplifiers, and more particularly to compensation of amplifiers employed in playing back magnetic tape or wire recordings.

In the previous art, it has been impossible to provide compensating means of sufficient simplicity and inherently low cost as to permit their use in home entertainment instruments, which at the same time were capable of large amounts or unlimited rates of compensation with respect to frequency without introducing excessive distortion or attenuation.

I have discovered that by the provision of a suitable negative feedback circuit applied against the last two stages of a conventional amplifier where the major portion of distortion often occurs, I can achieve frequency compensation with a minimum of distortion and with a minimum of attenuation.

An object of the present invention, therefore, is provide novel frequency compensating means in which the rate of compensation with respect to frequency is not limited to any specific value.

A further object is to provide compensating means permitting any desired amount of compensation without introducing distortion.

Another object is to provide compensating means permitting any desired amount of compensation without introducing excessive attenuation.

These and other objects of the present invention will in part be apparent, and in part pointed out in the following description and drawings in which Figure 1 is a typical uncompensated playback response from a magnetic recording.

Figure 2 shows ideal and practical compensation curves.

Figure 4:
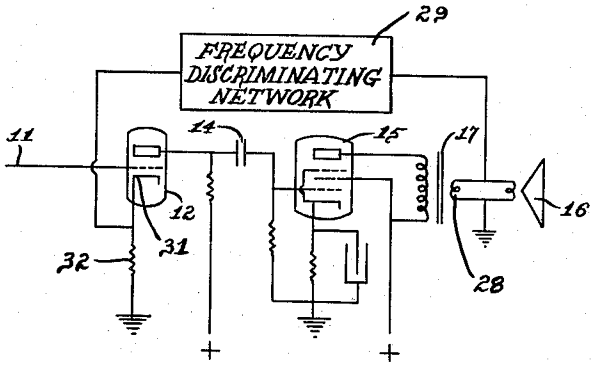
Figure 4 is a more specific compensation system.

Figures 5 through 10 inclusive are networks which may be employed in the circuit of Figure 4.

Figure 11 illustrates the type of frequency response attainable with the methods of the present invention.

In magnetic recording, such as tape or wire recording, it is usual to employ a frequency response such that the recording head current is substantially constant for a constant input signal over the frequency band involved. When such a recording is played back through an amplifier which has uniform or "flat" response for this range of frequencies, the overall response is of the type shown in Figure 1. For most sound recording applications the higher frequencies may be recorded with moderately larger currents, i. e., "pre-emphasis" may be employed. It is not practical, however, to use pre-emphasis to a degree which will result in uniform response during playback, and where a large dynamic range is desired, a substantially constant current recording characteristic will be employed.

It is evident that equalizing or compensation of the frequency response of the playback amplifier is required in order to obtain an overall flat response characteristic. The dashed curve 2 of Figure 2 is the reciprocal of the curve 3 of Figure 1 and represents the playback response required for perfect compensation.

When moderate amounts of compensation are required, as in the equalizing of phonograph pickups or for tone control purposes, it is common practice to use networks of resistors and condensers to provide the desired response. Compensation up to a maximum rate of 6 db per octave may be obtained with a resistor and condenser combination. If greater rates of compensation are required, more than one equalizing section may be employed, but this method is very wasteful of gain and proves to be completely impractical if compensation rates of 15 or more db per octave are necessary.

In such cases, tuned circuits may be used as circuit elements to provide impedances which vary rapidly with frequency. The rate of impedance variation may be controlled with resistance. Since the gain of an amplifier stage is a function of its load impedance, compensation may be effected by using an impedance which varies with frequency as an amplifier load.

Although this system is capable of rapid rates of compensation, the amount of compensation is rather limited because amplifier distortion is also a function of the load impedance. When substantial amounts of compensation are attempted by this method, distortion becomes excessive. The distortion can be minimized if the variable impedance is incorporated in a voltage divider of relatively large impedance. This introduces a large amount of attenuation for the entire frequency band, however, and additional gain is then required to make up for the attenuation.

Figure 3:
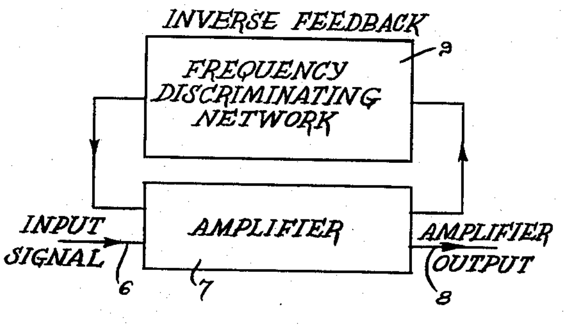
Figure 3 illustrates the general type of compensation of the present invention.

An improved equalizing system for this type of application is illustrated in Figure 3. In Figure 3 a signal is fed over the circuit 6 to the input of amplifier 7, the output of which extends over the conductor 8 to a suitable lead such as a loudspeaker. Connected between the input and output of the amplifier 7 is an inverse feedback frequency discriminating network 9.

As is well known in the art, the gain of amplifier 7 is controlled by the amount of feedback through the inverse feedback network 9. By varying the amount of feedback as a function of the frequency of the signal, the gain of the amplifier 7 will vary with respect to frequency. This type of compensation is not limited as to rate or amount of compensation nor does it introduce distortion.

Tuned circuits of suitable damping may be employed in the feedback network to provide the desired rates of compensation. The amount of compensation can also be determined by the degree of feedback employed without being wasteful of gain. Inverse feedback also reduces distortion and is desirable for this reason as well.

A convenient circuit arrangement is shown in Figure 4 in which feedback is applied against the last two stages of a conventional amplifier. The signal to be controlled is applied over the conductor 11 to the grid of the triode 12. The output of the triode is capacitatively coupled through the condenser 14 to the input of the pentode 15. The output of the pentode 15 is applied to the loudspeaker unit 16 through the transformer 17.

The secondary 28 of transformer 17 is connected through an inverse feedback frequency discriminating network 29 to the cathode 31 of the tube 12. Resistor 32 serves as a cathode resistor for the tube 12 and provides the termination for the feedback.

The output stage and sometimes the preceding stage contribute the major portion of the distortion of a well-designed amplifier. It is accordingly advantageous to apply the compensating feedback around these two stages since a substantial reduction of distortion may be obtained along with the frequency compensation.

Figure 5:
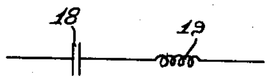

Figure 5 illustrates a network which may be used as impedance 29 to accomplish a major portion of the desired compensation as shown in Figure 2. Condenser 18 and inductance 19 series resonate at the frequency at which minimum gain is required. The network presents its minimum impedance at this frequency, thus providing the maximum amount of inverse feedback or gain reduction. Above and below the series resonant frequency, the impedance of the network rises and phase shift is introduced, thus reducing the amount of inverse feedback and allowing the amplifier gain to increase. This network can provide virtually complete compensation below the series resonant frequency. However, above the series resonant frequency, the rate of compensation is not as great as desired.

Figure 6:
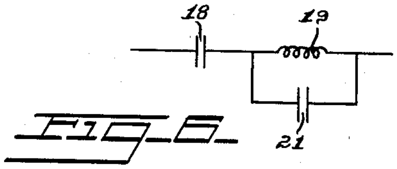

The impedance of the network may be made very high at any predetermined frequency above the series resonant frequency by parallel resonating inductance 19 with a condenser 21 as shown in Figure 6. Since the impedance of the parallel resonant circuit is much greater than the impedance of the inductance alone at the parallel resonant frequency, it is evident that the rate of compensation is increased. In fact, it is quite possible to over-compensate at the parallel resonant frequency while being under-compensated for frequencies down to the series resonant frequency.

Figure 7:
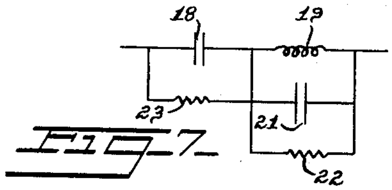
Figure 8:
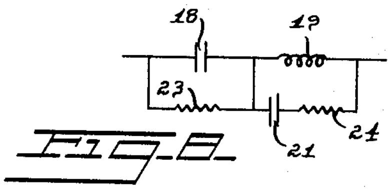

For this reason it is usually best to control the damping of the parallel resonant circuit with a resistor such as 22 of Figure 7 or 24 of Figure 8. The resistor is chosen along with the value of condenser 21 so as to prevent over-compensation at the parallel resonant frequency while matching the desired response as closely as possible between the series and parallel resonant frequencies. Inductance 19 may have enough self-resistance to provide adequate damping but ordinarily a separate resistor is desirable. In like manner a resistor 23 may be used to limit the rise of low frequency response.

Figure 9:
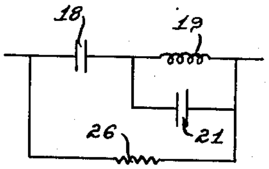

Figure 9 illustrates a case where a single resistor 26 not only provides damping for the parallel resonance but also limits the rise of low frequency response.

The solid curve 4 of Figure 2 is typical of response characteristics attainable with this type of compensation. Its deviation from the ideal curve is shown in Figure 11. It is evident that a substantially uniform response can be obtained. The principal deviation from flat response in the example shown is occasioned by the low frequency resonance of the loudspeaker. If desired, more inverse feedback could be employed over the entire frequency band to provide more damping for this resonance while leaving the rest of the curve unaltered.

Figure 10:
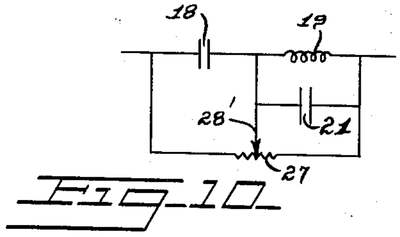

In Figure 10 the resistor 27 duplicates the functions of resistors 22 and 23. Moving arm 28′ toward one end or the other of resistor 27 will limit the treble or bass response, thus serving as a tone control.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. In combination, an amplifier circuit, an input circuit to said amplifier for impressing signals thereon and an output circuit for said amplifier, said amplifier having a frequency response varying as a function of frequency, said frequency response having a portion having a relatively large rate of gain, a portion having a relatively small rate of gain and a portion having a maximum gain, and a negative feedback circuit comprising a series resonant tuned circuit comprising an inductance and capacitance in series connecting the output to the input circuit and having a negative feedback characteristic varying as a function of the frequency of the signal, said series resonant circuit being resonant at a frequency corresponding to said portion of said frequency response having a maximum gain, a capacitance connected across said inductance to form therewith a parallel resonant circuit, said parallel resonant circuit being resonant at a frequency corresponding to said portion of said frequency response having a relatively large rate of gain, and a damping resistor in parallel circuit connection across said parallel resonant circuit, said damping resistor preventing excessive compensation at said parallel resonant frequency while matching the desired response between the series and parallel resonant frequencies, and a resistor connected in parallel with said series capacitance for limiting the rise of said portion of said low frequency response having a relatively small rate of gain.

2. In combination, an amplifier circuit, an input circuit to said amplifier for impressing signals thereon; an output circuit for said amplifier, said amplifier having an uncompensated response, comprising a portion requiring rates of compensation greater than 15 db per octave, a maximum gain portion and a portion requiring rates of compensation less than 15 db per octave; a series resonant tuned circuit comprising an inductance and capacitance in series connecting said output circuit to said input circuit, said series tuned circuit being resonant at the frequency corresponding to said maximum gain portion of said uncompensated response of said amplifier; a capacitance connected across said inductance to form therewith a parallel resonant circuit, said parallel resonant circuit resonating at a frequency corresponding to said portion of said uncompensated response of said amplifier requiring a rate of compensation greater than 15 db per octave; a damping resistor in parallel circuit connection across said parallel resonant circuit to prevent overcompensation at the parallel resonant frequency; and a resistor connected in parallel to said first mentioned capacitance of said series resonant circuit to prevent overcompensation at frequencies corresponding to said portions of said uncompensated response of said amplifier having a rate of compensation less than 15 db per octave.

3. In combination, an amplifier circuit, an input circuit to said amplifier for impressing signals thereon; an output circuit for said amplifier, said amplifier having an uncompensated response, comprising a portion requiring rates of compensation greater than 15 db per octave, a maximum gain portion and a portion requiring rates of compensation less than 15 db per octave; a series resonant tuned circuit comprising an inductance and capacitance in series connecting said output circuit to said input circuit, said series tuned circuit being resonant at the frequency corresponding to said maximum gain portion of said uncompensated response of said amplifier; a capacitance connected across said inductance to form therewith a parallel resonant circuit, said parallel resonant circuit resonating at a frequency corresponding to said portion of said uncompensated response of said amplifier requiring a rate of compensation greater than 15 db per octave; and a potentiometer having its ends connected across said series resonant circuit and its center tap connected between said capacitance and inductance of said series resonant circuit acting as a tone control.

LAWRENCE V. WELLS.

References Cited in the file of this patent

UNITED STATES PATENTS

| Number | Name | Date |
|---|---|---|
| 2,033,963 | Ware | Mar. 17, 1936 |
| 2,038,879 | Willans | Apr. 28, 1936 |
| 2,207,933 | Mountjoy | July 16, 1940 |
| 2,210,384 | Rust et al. | Aug. 6, 1940 |
| 2,231,374 | Stillwell | Feb. 11, 1941 |
| 2,231,863 | Clay | Feb. 18, 1941 |
| 2,250,598 | Neeteson | July 29, 1941 |
| 2,256,072 | Brück | Sept. 16, 1941 |

OTHER REFERENCES

Terman Text, "Radio Engineering," 3rd ed., pp. 320–326, pub. 1947 by McGraw-Hill Book Co., N. Y.